March 29, 1932. G. S. COX ET AL 1,851,350
LIQUID DISPENSING DEVICE
Filed July 26, 1929  8 Sheets-Sheet 5

INVENTORS
GEORGE S COX
HARRY J. ALMSTEDT
By Edward E. Longan
ATTORNEY

March 29, 1932. G. S. COX ET AL 1,851,350
LIQUID DISPENSING DEVICE
Filed July 26, 1929 8 Sheets-Sheet 6

INVENTORS
GEORGE S. COX
HARRY J. ALMSTEDT.
By Edward E. Longan
ATTORNEY

March 29, 1932.   G. S. COX ET AL   1,851,350
LIQUID DISPENSING DEVICE
Filed July 26, 1929   8 Sheets-Sheet 8

INVENTORS
GEORGE S. COX
HARRY J. ALMSTEDT
By Edward E. Longan
ATTORNEY.

Patented Mar. 29, 1932

1,851,350

UNITED STATES PATENT OFFICE

GEORGE S. COX AND HARRY J. ALMSTEDT, OF ST. LOUIS, MISSOURI, ASSIGNORS TO ARGYLE PRODUCTION COMPANY, OF ST. LOUIS, MISSOURI, A CORPORATION OF DELAWARE

LIQUID DISPENSING DEVICE

Application filed July 26, 1929. Serial No. 381,173.

Our invention relates to improvements in liquid dispensing devices, and has for its primary object a dispensing device which is so arranged that no cheating by an employee either of a customer or the proprietor of an establishment where such a device is used, is possible.

A further object is to construct a dispensing device which employs a transparent bowl having a dispensing tube which is raised above the bottom thereof so as to set up the device for a predetermined unit quantity of liquid and in which the tube is so arranged that no dispensing can take place unless a quantity of liquid equal to the set-up has been supplied to the bowl.

A further object is to construct a liquid dispensing device which has a vertically adjustable dispensing tube located in a transparent bowl and in which the dispensing tube is so controlled that after the tube has been raised for a predetermined set-up, it cannot again be lowered by the means through which it was set up. In other words, the tube set-up means can be turned in one direction only until after the tube has been lowered by a means other than the setting up means.

A still further object is to construct a liquid dispensing device having a pump to supply liquid to a transparent bowl and in which the pump is automatically locked against operation as soon as dispensing commences and remains locked until a new set-up of at least one quantity unit has been made thereby preventing the operator from supplying additional liquid to the bowl after dispensing has commenced so that it will be impossible to supply a customer more liquid at one operation than the set-up calls for.

A further object is to construct a dispensing device in which a pump for supplying the liquid to a transparent bowl is automatically locked as soon as liquid dispensing commences, and is automatically unlocked upon making a new set-up.

A still further object is to construct a liquid dispensing device having a transparent bowl in which a vertically adjustable dispensing tube is used and in which means is provided for lowering the dispensing tube step by step so that the liquid in the bowl will be dispensed unit by unit as the dispensing tube is lowered, the dispensing tube being provided with a locking means to prevent it being lowered unless an amount of liquid equal to the set-up has been supplied to the bowl. In this way it is impossible for the person dispensing liquid to make a set-up, say for eight units, then supply only five liquid units to the customer, and still lead the customer to believe that he has received eight units if he has observed the set-up made in the bowl.

A further object is to construct a liquid dispensing device as aforementioned in which the pump used for supplying liquid to the bowl is automatically locked as soon as dispensing commences and cannot again be unlocked until a new set-up has been made. This prevents the operator from favoring certain customers by supplying additional liquid to the bowl during the dispensing. In other words, by our construction the exact quantity of liquids indicated by the set-up in the bowl must be supplied before the dispensing operation can commence and it will be impossible to supply additional liquid to the bowl after dispensing for a predetermined set-up has commenced until that quantity of liquid has been drained from the bowl and a new set-up made.

A still further object is to construct a liquid dispensing device having a vertically moving dispensing tube, which is designed to be set up for a predetermined quantity of liquid in a transparent bowl in which the means used for making this set-up is automatically locked so that no lowering of the tube can be had or done by this means until the tube has been lowered to its utmost extent by a separate means and which lowering to this position will automatically unlock the set-up operating means so that it can be returned to its original position and ready for making a new set-up.

Figures 1, 2:
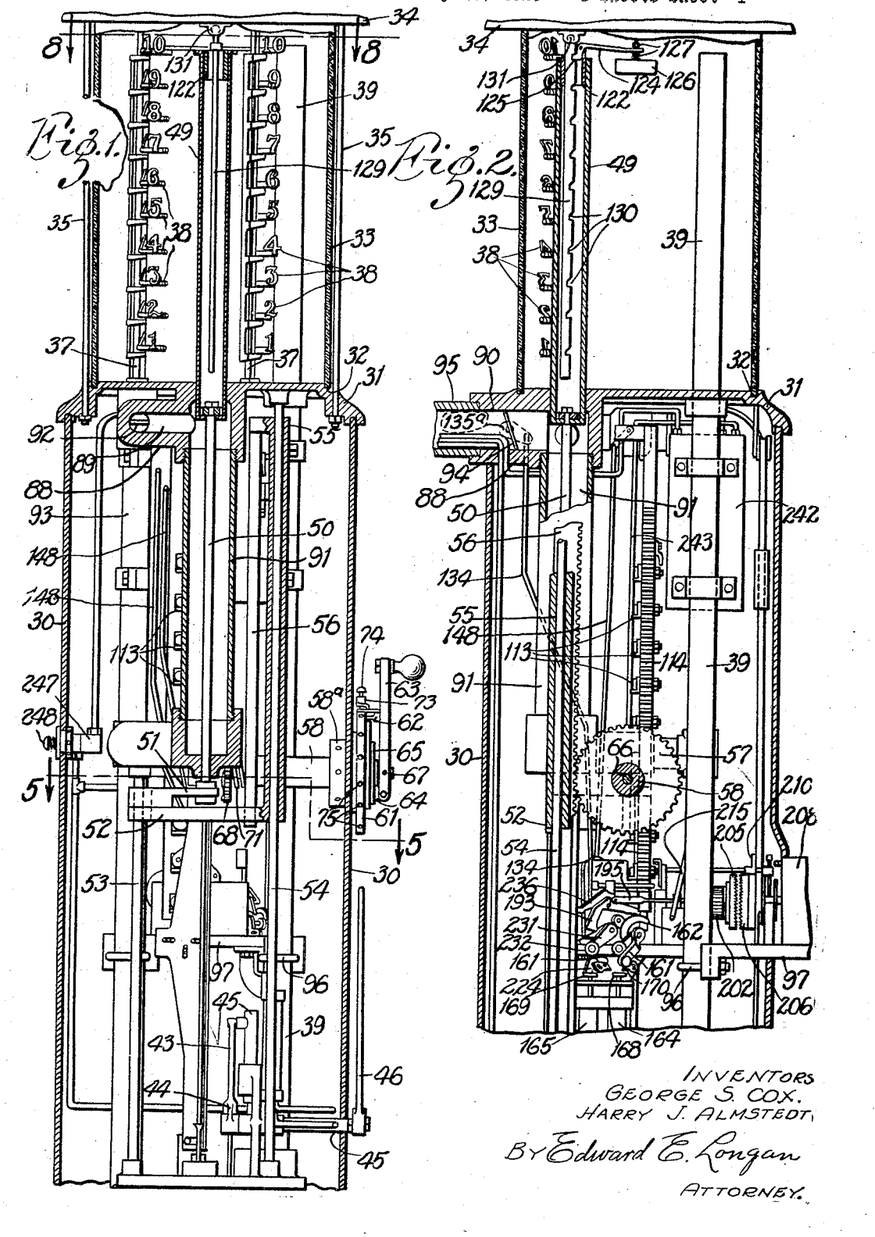
Fig. 1 is a fragmental vertical section of our device showing certain portions of the set-up mechanism, dispensing tube, and dispensing mechanism.
Fig. 2 is a similar view but taken on a plane at right angles to the section of Fig. 1.

In carrying out our invention we employ a standard 30, on the top of which is secured a plate 31. This plate is provided with a recess 32 of circular shape to receive the lower end of a transparent dispensing bowl 33. The upper end of the dispensing bowl 33 is designed to fit into a cap 34. Rods 35 secure the plate 31 and cap 34 together thereby holding the bowl securely in position. The standard 30 is mounted on a base 36. Located within the bowl 33 are standards 37 which carry indicating numerals 38. These indicating numerals are arranged to be set up as indicated in Figs. 1 and 2 when a set-up for a predetermined amount of liquid units within the bowl is made and are designed to be lowered as the dispensing takes place. The peculiar construction and mode of operating these numerals or indicating symbols has been fully explained in an application filed by us on November 5, 1928, Serial No. 317,166.

Extending upward into the bowl is a liquid supply tube 39, its lower end being connected to a pump 40, which pump is located in the standard 30. The pump has also connected thereto a pipe 41, which leads to some suitable source of liquid supply, preferably an underground tank although this is not essential except in the case where inflammable fluids or liquids are dispensed and where the underwriters' rulings call for such storage tanks to be placed under ground.

The pump is provided with a pump rod 42 which is attached to one end of a link 43, the opposite end of the link 43 being attached to a lever 44 and adjacent one end thereof. The opposite end of the lever 44 is carried by a shaft 45, which projects through the standard 30 and is provided on its projecting end with a handle 46 by means of which the lever 44 can be moved up and down thus operating the pump. The rod or shaft 45 is also provided with a dog 47 which has a tooth 48. The purpose of this tooth is to lock the pump and operating handle against movement. This will be explained in detail later.

Extending upward into the transparent bowl is a dispensing tube 49. This tube has its lower end secured to a rod 50, which rod in turn is secured to an arm 51 forming part of a yoke 52. The yoke 52 is slidably mounted on shafts or standards 53 and 54. That part of the yoke surrounding the standard 54 has an upwardly extending portion 55, to which one end of a rack 56 is secured, the opposite end of the rack 56 being secured to the yoke 52.

Figures 3, 4, 11, 12, 13:
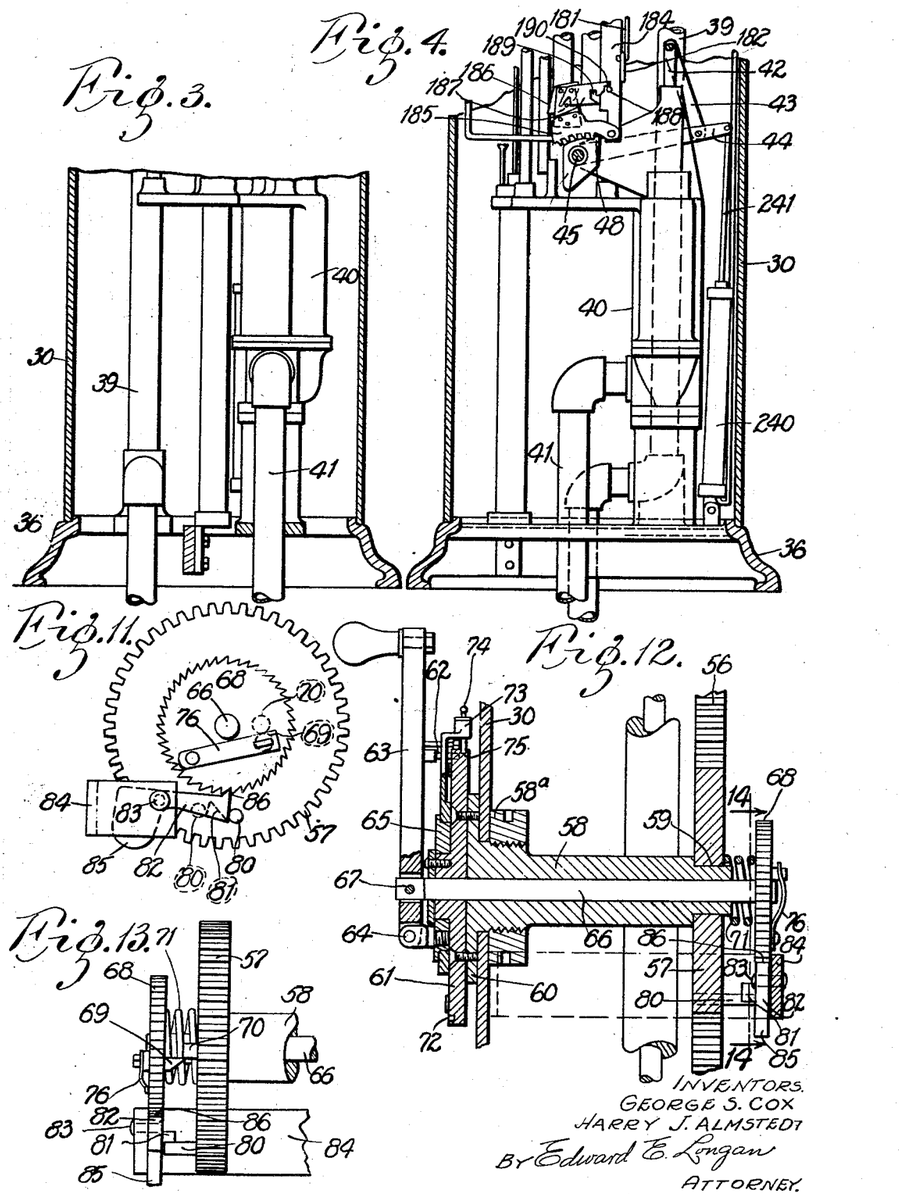
Fig. 3 is a vertical fragmental section of the base of the dispensing device and is a continuation of Fig. 1.
Fig. 4 is a vertical fragmental sectional view of the base and is a continuation of Fig. 2, this view showing the locking mechanism for the pump in position.
Fig. 11 is an enlarged rear view of a portion of the mechanism used for raising the dispensing tube showing the locking means and its manner of operation.
Fig. 12 is an enlarged vertical fragmental view of the dispensing tube set-up mechanism.
Fig. 13 is a side elevation of the mechanism disclosed in Fig. 11.
Figure 5:
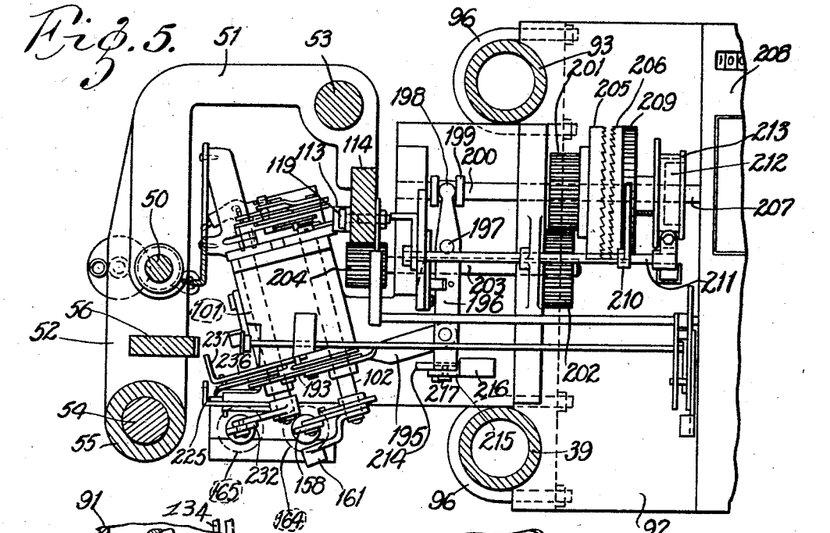
Fig. 5 is a horizontal section taken on the line 5—5 of Fig. 1.
Figure 6:
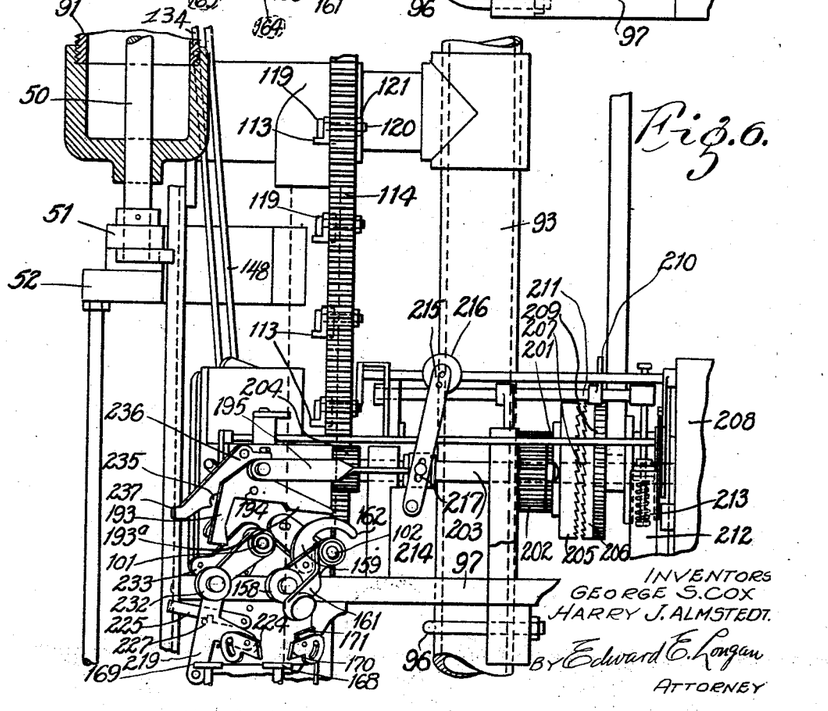
Fig. 6 is an enlarged fragmental view with parts in section of a dual control device employed in connection with the dispensing mechanism.

Meshing with the rack 56 is a gear 57. The gear 57 is mounted on a sleeve 58 which is carried by the standard 30. The method of mounting this sleeve is clearly shown in Fig. 12. The sleeve is so mounted that it cannot rotate in the casing 30, being held by a lock nut 58a. The gear 57 is loosely mounted on the reduced end 59, of the sleeve.

The outer end of the sleeve 58 is provided with a flange 60 to which is secured a plate 61. This plate has various openings therein so that a pin 62 carried by the handle 63 can enter therein. The handle 63 is carried by a lug 64, which is attached to a rotatable plate 65 carried by the indicator plate 61.

Passing through the sleeve 58 is a shaft 66, which is pivotally secured at a point 67 to the handle 63. To the opposite end of the shaft 66 is secured a ratchet wheel 68 which ratchet wheel is provided with a projecting tooth 69 on the face adjacent the pinion 67.

The pinion 67 is also provided with a tooth or projection 70.

Interposed between the ratchet wheel 68 and gear 57 is a spring 71 which has a normal tendency to force the ratchet away from the pinion 57 so that the tooth 69 will pass the projection 70 and in order to cause the pinion 57 to turn, it is necessary to pull forward on the handle 63, compressing the spring 71 so that the tooth 69 can engage with the projection 70. This movement also carries the pin 62 out the openings 72 formed in the plate 61. This permits the handle to turn and at the same time imparts motion to the gear 57, and the turning of this gear 57 meshing with the rack 56 raises the yoke 52 and consequently the dispensing tube 49.

A stop 73 is also carried by the plate 65. This stop is provided with a pin 74 which is designed to enter openings 75 formed in the periphery of the plate 61. The stop is for the purpose of making a primary setting or indication on the dial and to prevent the handle 63 from being turned farther than this setting.

The pin 69 is controlled by means of a leaf-spring 76 and due to the inclined edge of the pin 69, this pin can pass the projection 70 when the projection moves in one direction, but it will engage therewith when moving in the opposite direction.

The gear 57 is also provided with a pin 80, which pin is adapted to contact with the inclined lug 81 carried by the pivotally mounted dog 82 and when so contacting moves the dog 82 out of contact with the ratchet 68 thereby permitting the handle 63 to be returned to its starting point. The pin 80, however, does not contact with the inclined lug 81 unless the gear 57 is in such a position that the dispensing tube is at its lowest possible point. The dog 82 is pivoted at the point indicated by the numeral 83 in the yoke 84, which is carried by the standard 30. The dog 82 is provided with a counterweight 85 which has a normal tendency to cause the tooth 86 of the dog to move upward in contact with the ratchet wheel 68. The teeth on this ratchet wheel are so cut that the wheel can be rotated freely in one direction, that is the direction used to raise the dispensing tube but on an attempt to rotate the wheel in the opposite direction so as to lower the same, the tooth 86 will engage with the teeth on the ratchet wheel 68 and prevent such movement.

Carried by the under face of the plate 31 is a projecting portion 88, which has formed therein a residue passage 89 and a dispensing passage 90. Secured to the lower end of the projection 88 is a well 91, which under normal conditions is always full of liquid. This well is for the purpose of permitting the dispensing tube 49 to descend till its upper edge is substantially on a level with the upper surface of the plate 31. The residue passage 89 is provided with a residue valve 92, which is normally open so that fluid, which overflows the dispensing tube 49 during the filling or supplying of fluid to the dispensing bowl 33, can again flow out through the residue pipe 93 and return to the storage tank. The operation of this residue valve will be explained in detail later.

Figure 25:
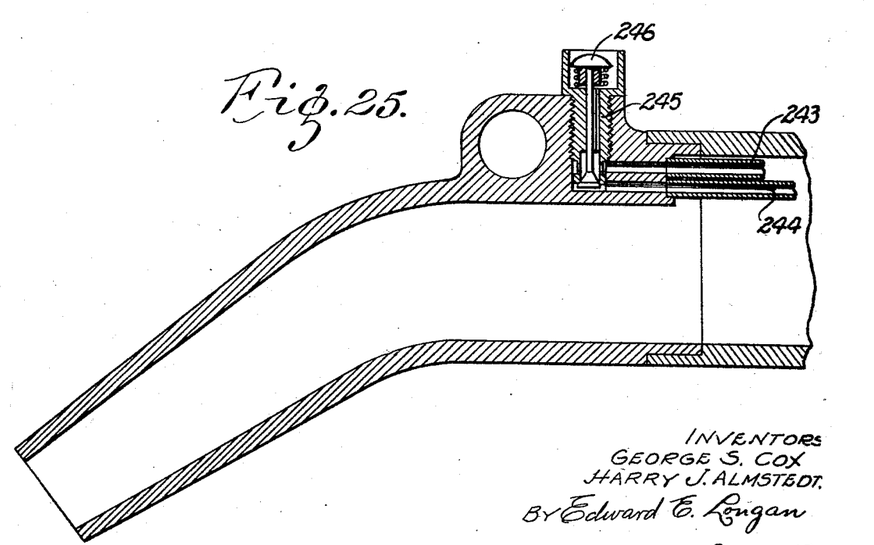
Fig. 25 is a longitudinal section of the nozzle showing the air valve which controls the dispensing valve operating mechanism.

The passage 90 has located therein a dispensing valve 94. This valve is normally closed and its operation will be explained in detail later. Carried by the projection 88 and concentric with the passage 90 is a tube 95 to which is attached a flexible conduit or dispensing hose not shown, and which hose is provided on its outer end with a dispensing nozzle. (See Fig. 25.)

Surrounding the pipes 39 and 93 and located within the housing 30 are U bolts or clips 96. These U bolts or clips support a plate 97. On the plate 97 and within the housing 33 is secured a bracket 98. This bracket is provided with upwardly extending portions 99 and 100. Through the bracket 98 extend shafts 101 and 102. The shaft 101 has secured to its end a cam 103, which has a flattened projection 104 extending therefrom. Carried by the bracket 99 is a stud 105, which carries a pivotally mounted arm or lever 106. The lever 106 is also provided with a shoulder 107 with which a tooth 108 carried by a lever 109 engages.

The lever 109 is pivotally carried on a stud 110, which is also carried by an extension 99. The lever 109 is provided with a projection 111, which carries a pivoted dog 112. The pivoted dog 112 is adapted to engage with the dogs or stops 113 carried by the rack 114. The rack 114 is provided with a bore 115, which extends entirely therethrough on one face with a slot or groove 116. In this groove pins 117 carried by the dog 113 extend. The purpose of these pins is to prevent the dog from tipping.

Through the bore 115 extends a bolt 118, which is provided on one end with an eccentrically formed cylindrical head 119. The opposite end of the bolt 118 is screw threaded as at 120 and carries the nut 121. In this way a very fine adjustment of the lugs or stops 113 can be obtained because in order to adjust the stop up or down, it is only necessary to loosen the nut 121 and turn the bolt, keeping the stop 113 against the periphery of the head, and then when the desired adjustment has been reached, tighten up the nut 121. By this construction not only can a very accurate adjustment be obtained but the necessity of using lock nuts is obviated.

Secured in the upper end of the dispensing tube 49 is a spider 122, which has upwardly extending arms 123. Between these arms is pivotally secured a locking lever 124, which is substantially L shaped and which is provided on its short arm with a tooth 125. The opposite end of the lever 124 has secured thereto a float 126. This float is held on the arm by means of nuts 127, which nuts have rounded faces so that the float can rock and remain level as it raises and lowers. The spider is provided with a slot 128 through which a bar 129 passes. The bar 129 is provided with a series of notches 130 with which the tooth 125 is designed to engage. The bar 129 is secured to the cap 34 at the point indicated by the numeral 131.

The bar extends downward through the dispensing tube as illustrated in Figs. 1 and 2. This bar is provided with the same number of notches as there are indicating numerals in the bowl. The float normally holds the tooth 125 so that it will engage with the notches as illustrated in Fig. 9 and when in this position there is no possibility of lowering the dispensing tube because the tooth will engage with the lower face of a notch and prevent the tube from being lowered.

Figure 9:
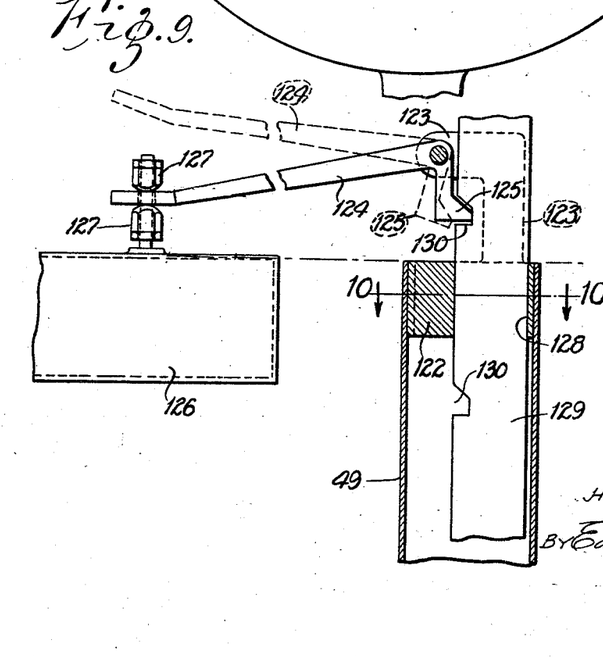
Fig. 9 is an enlarged fragmental view of the mechanism employed for locking the dispensing tube against downward movement.
Figure 10:
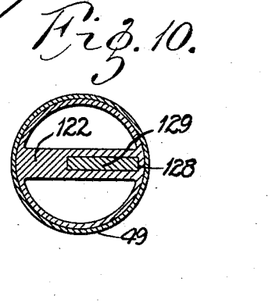
Fig. 10 is a section taken on the line 10—10 of Fig. 9.
Figure 14:
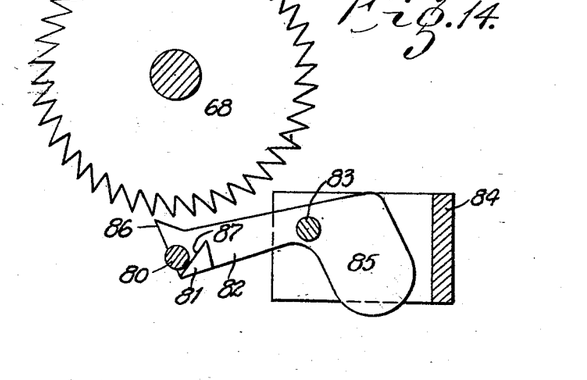
Fig. 14 is an enlarged fragmental sectional view of the locking means taken on the line 14—14 of Fig. 12.
Figure 15:
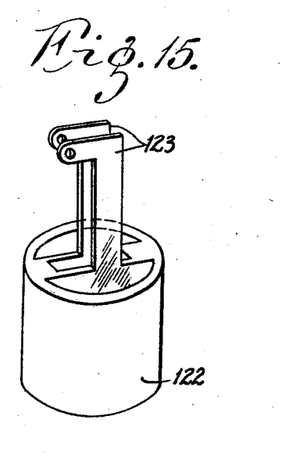
Fig. 15 is an enlarged perspective view of the bracket employed for holding the dispensing tube locking mechanism.
Figure 16:
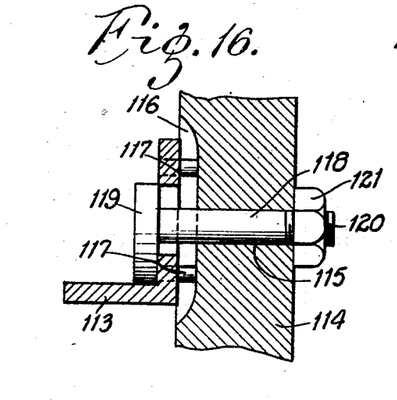
Fig. 16 is an enlarged fragmental view of the stop adjusting mechanism for controlling the unit by unit dispensing of the liquid and taken on the line 16—16 of Fig. 17.
Figure 17:
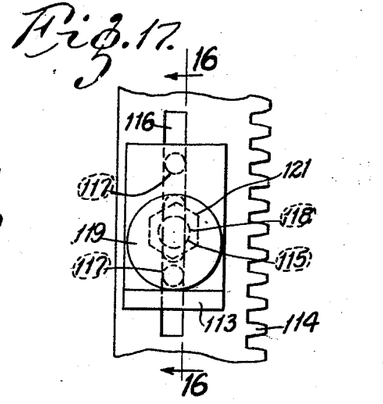
Fig. 17 is a face view of the rack and stop looking in the direction of the arrow 17 of Fig. 16.

The only way in which this tube can be released is by supplying a quantity of liquid to the bowl sufficient to reach the top of the dispensing tube when the float will be raised and swing the tooth out of engagement with the notch as illustrated by dotted lines in Fig. 9.

The lever 124 will remain in the position illustrated by dotted lines in Fig. 9 just as long as liquid remains in the bowl but upon the bowl being completely drained, the tooth 125 will again enter a notch. During the setting-up of the tube 49, however, the tooth is enabled to ride out of the notch so that it will be possible to set up the tube but, as before mentioned, the tube cannot be unlocked until an amount of liquid equal to the set-up has been supplied to the dispensing bowl. This prevents the operator from making a set-up for a predetermined quantity and then only supply part of the liquid to the bowl and operate the dispensing tube thereby giving a false indication of the total amount of liquid units dispensed.

Carried by the bracket 100 is a lever 132. This lever is pivotally mounted at one end as indicated by the numeral 133, its opposite end being attached to a rod 134. The opposite end of the rod 134 is attached to a lever or arm 135a, which operates the dispensing valve 94.

Figure 21:
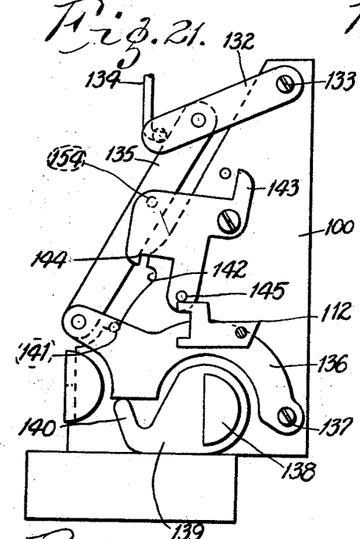
Fig. 21 is a fragmental elevation with parts in section of the dispensing valve control mechanism.
Figure 22:
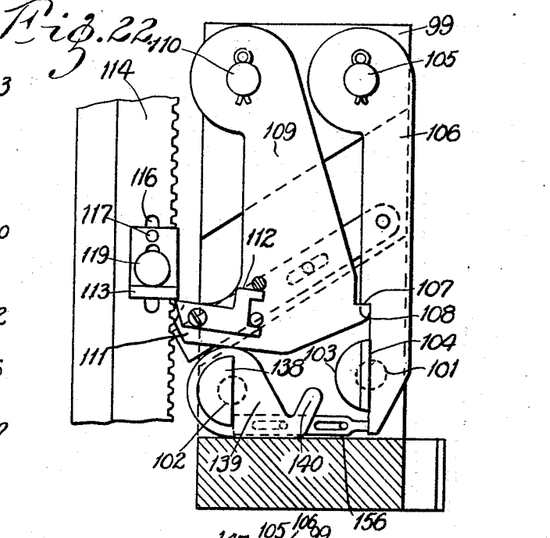
Fig. 22 is a side view of the dual control lever mechanism employed in releasing the dispensing tube.

Secured to the lever 132 and intermediate its ends is one end of a lever 135. The opposite end of this lever is attached to the lever 136. This lever is pivotally mounted on the bracket 100 at the point indicated by the numeral 137. The shaft 102 has a cam surface 138 formed on its end. This shaft also carries a cam lever 139, which cam lever is provided with an upwardly extending end 140, which contacts with the lever 136. The lever 136 also carries a pin 141, which pin is designed to ride upward and enter the notch 142. When this pin reaches the notch 142, the lock trigger 143 being free to act permits the tooth 144 to slip over the pin 141 and hold it. This holds the residue valve open until such time as one of the stops 113 come in contact with the lever 112. This trips the lever 112 causing it to contact with the pin 145 carried by the lock trigger 143, rocking it so as to release the cam lever 136 and permitting the lever 136 together with the levers 132 and 135 again to drop, assuming the position illustrated in Fig. 21 thus closing the dispensing valve 94.

Pivotally carried by the bracket 100 at the point indicated by the numeral 146 is one end of a lever 147. To the opposite end of this lever is attached a rod 148. The opposite end of this rod is attached to the residue valve 92. This residue valve is operated in a manner similar to the dispensing valve 94. Pivotally secured to the lever 147 is one end of a lever 148a. The opposite end of this lever is pivotally attached to a lever 149, which lever is pivotally carried at one end by the bracket 100 as indicated by the numeral 150.

The bracket 100 also carries a pivoted locking lever 151, which is provided with a notch 152 in which the tooth 153 formed on the lever 149 is adapted to engage. This is for the purpose of holding the residue valve in open position. The lever 135 also carries a pin 154, which pin is designed to contact with the locking lever 151 so as to release the tooth 153 from the notch 152 and permit the levers 147, 148a and 149 to drop thereby closing the residue valve. This closing of the residue valve takes place just before the dispensing valve opens so that there will be no possibility of liquid from the dispensing bowl passing into the residue valve at the time the dispensing commences.

Figure 23:
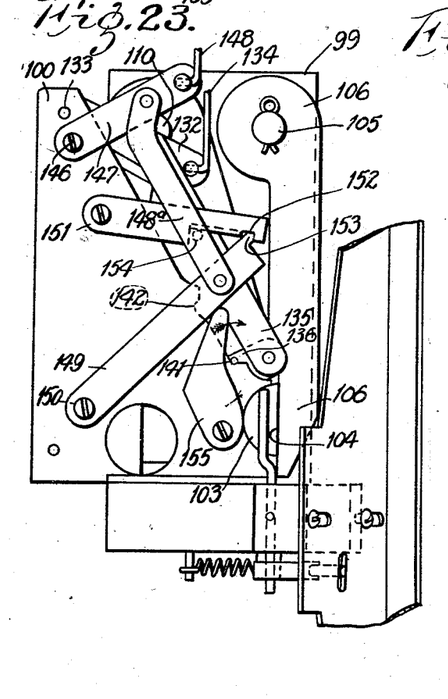
Fig. 23 is a side view of the lever mechanism employed in controlling the dispensing and residue valves.
Figure 24:
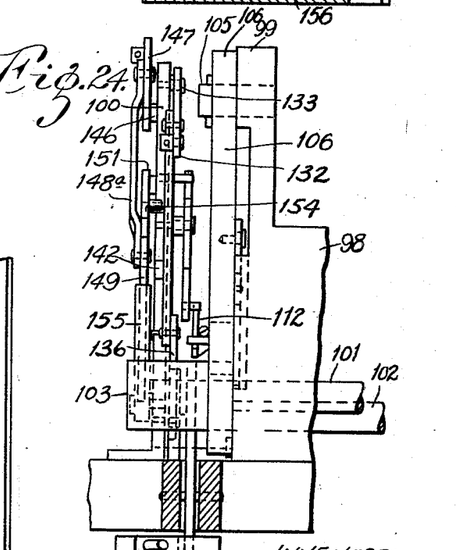
Fig. 24 is an end view of the same.

The lever 149 is designed to be raised into the position disclosed in Fig. 23 by means of the cam pawl 155. This cam pawl is moved in the direction indicated by the arrow as the levers descend and is to be moved in the opposite direction by the flat portion 104 carried by the cam 103. The shaft 102 or rather the flat portion of the cam 138 carried thereby is designed to contact with a sliding bar 156, which moves the levers 106 backward so as to release the lever 109 permitting it to swing backward and release one of the dogs carried by the rack 114.

On the opposite end of the shaft 102 is mounted a lever 157. This lever carries on its free end a roller 158. The lever 157 can rotate freely on the shaft 102 and is provided with a cam lever 159, which contacts with a pin 160 carried by the shaft so that the shaft can be rotated. A counterweight 161 is designed to bring the shaft 102 to its original position. This shaft is released by reason of the end 162 of the cam 159 coming in contact with the plate 97 raising it so as to release the pin.

Carried by the plate 97 is a bracket 163, which bracket in turn carries air cylinders 164 and 165. In these air cylinders are located pistons having piston rods 166 and 167. On top of these pistons are plates 168 and 169. The plate 168 is designed to come in contact with the roller 158 and operate the lever 157. In moving upward the plate 168 comes in contact with a pivoted pawl 170, which pawl is pivoted to a lever 171 carried by the projection 180, which in turn extends from the underside of the plate 97. The lever 170 is pivoted to this projection and has attached thereto a rod 181. The lower end of this rod is attached to a lever 182, which is provided with a hook 183. The lever 182 is pivotally attached to a rod or support 184, which is located inside of the standard 30.

Figures 18, 19, 20:
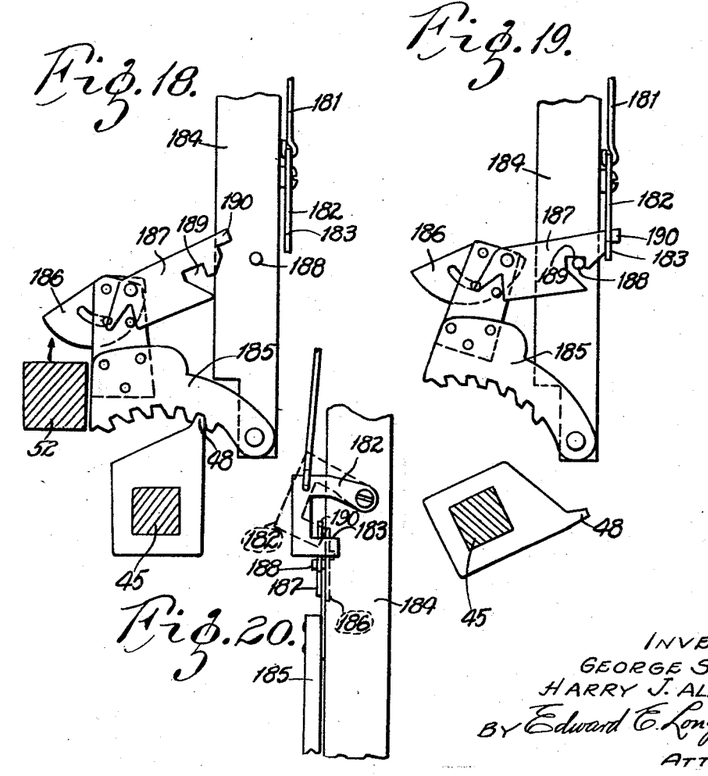
Fig. 18 is a fragmental view with parts in section of the pump locking mechanism showing the same in locked position.
Fig. 19 is a similar view showing the same in unlocked position.
Fig. 20 is a view looking in the direction of the arrow 20 of Fig. 19 showing the mechanism employed for releasing the locking mechanism so as to lock the pump when dispensing commences.

Pivotally secured to the standard 184 is a curved ratchet rack 185, which is provided with a pivoted dog 186 and with a locking dog 187. The pivoted dog 186 is designed to be contacted with by the yoke, or a portion of the yoke 52, as a set-up is made and raise the rack upward so that the locking lever 187 can pass over the pin 188 carried by the bar 184 when the notch 189 will drop over this pin as illustrated in Fig. 19 and prevent the ratchet from dropping. At this time the projection 190 passes through the hook 183 and upon raising of the cam lever 170 and lever 171, the locking lever 187 will be raised and freed from the pin permitting it to again drop and assume the position shown in Fig. 18. When in this position, the tooth 48 of the dog 47 will be in position to engage with the ratchet teeth and thus prevent the pump from being operated until a new set-up has again been made.

It will be noted from Fig. 18 that the cam pawl 186 will contact or be operated by the yoke 52 only while the yoke is being raised, that is when a set-up is being made, but on the downward movement this pawl can freely swing inward and permit the yoke to pass by. This effectually prevents any liquid from being added to the dispensing bowl after dispensing has commenced because then the pump is locked and remains locked until such time as a new set-up is made.

Carried by the shaft 102 is a lever 191, which is provided with a pin 192, which pin is designed to contact with a cam lever 193, which is pivotally secured to the bracket at the point indicated by the numeral 194. Attached to the cam lever 193 is one end of a lever 195, the opposite end of this lever being attached to a lever 196, which is pivoted intermediate its ends at the point indicated by the numeral 197. The end 198 of the lever 196 is bifurcated and engages with a collar 199 carried by a shaft 200. This shaft is provided with a gear 201, which meshes with a gear 202 carried by the shaft 203. The shaft 203 also carries a gear 204, which meshes with the rack 114.

The shaft 200 also carries a clutch member 205 which is designed to engage with a clutch member 206 carried by a shaft 207. This shaft in turn leads to a recording device 208. This recording device is not illustrated in detail because it forms no part of the present invention.

The shaft 207 is provided with a ratchet tooth wheel 209 with which a pawl 210 carried by a shaft 211 engages. This is to prevent the recording device from being operated in a reverse direction. The shaft 211 also carries a brake band 212, which operates around a brake drum 213 and which is designed to prevent the recording device from being operated too fast.

Carried by the plate 97 is a bracket 214 to which is pivotally secured one end of a lever 215. The opposite end of this lever is provided with a weight 216. The lever 215 is attached intermediate its ends at the point indicated by the numeral 217 to the lever 196. The purpose of this counter weight is to hold the clutch member 205 either in or out of engagement with the clutch member 206.

Pivotally carried by the plate 97 at the point indicated by the numeral 218 is a lever 219. The free end of this lever is provided with a pin 220 with which the inclined edge 221 of a cam plate 222 carried by the rack 56 is designed to contact. The lever 219 is provided with an extension 223, which carries a pivoted dog 224. The plate 180 has pivoted thereto one end of a latch lever 225. This latch lever is provided with a notch 226, which is designed to receive the pin 227 carried by the lever 219. The purpose of the lever 219 is to prevent the dispensing valve mechanism from being operated when the dispensing tube is in its lowest position because as this tube together with the rack 56 approaches the lowest position, the inclined face 221 of the cam plate 222 contacts with the pin 220 forcing the lever 219 to the right. This brings the pin 227 in position so that the locking lever 225 can drop down thereby permitting the pin 227 to enter the notch 226.

This movement also brings the pivoted dog 224 over the plate 168 carried by the rod 166 and prevents this rod and plate from moving up sufficiently high to operate the dispensing valve. When a new set-up is made, the raising of the rack 56 also raises the pivoted dog 228, one arm of which then contacts with the latch lever 225 raising it and permitting the lever 219 to assume the position shown in Fig. 7, thus removing the pivoted dog 224 out of the path of travel of the plate 168. It will be noted that the dog 228 is substantially L shaped and is pivoted at the point indicated by the numeral 229. A pin 230 also carried by the rack 56 is designed to contact with one arm of the dog 228 and prevents it from swinging in one direction, that is while the rack is being raised and while it is in contact with the locking lever 225, but on the descent of the rack 56, this dog can swing so that it will pass the locking lever without operating it.

Carried by the shaft 101 is a lever 231, which is provided with a roller 232. This roller is designed to be contacted with by the plate 169 and is for the purpose of opening the residue valve. The shaft 101 also carries a cam lever 233. This lever is provided with a pin 234, which is designed to enter the notch 235 formed in the lever 236. This lever is pivotally carried by the bracket 99 so that when the lever 231 and lever 233 are raised, the pin will enter this notch and hold these two levers in elevated position thereby locking the clutch shifting mechanism and holding the residue valve in open position.

Figures 7, 7A:
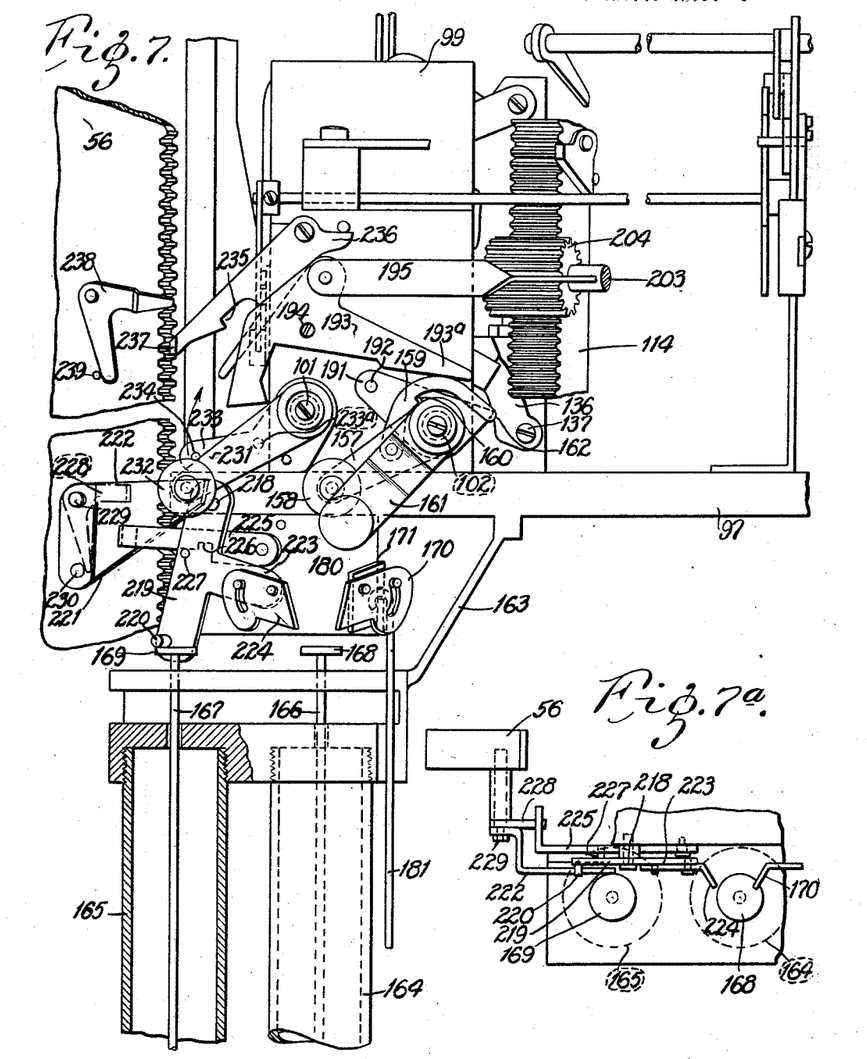
Fig. 7 is an enlarged fragmental view of a portion of the lever mechanism employed in the dispensing operation.
Fig. 7a is an enlarged view of the operating means by which the dispensing and residue draining levers and the pump lock operating trigger are operated.
Figure 8:
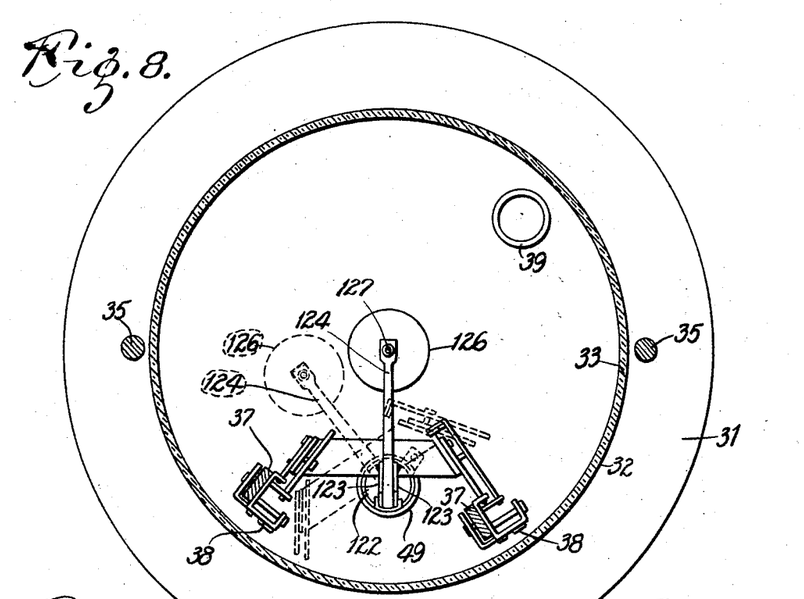
Fig. 8 is an enlarged section taken on the line 8—8 of Fig. 1 showing the dispensing tube and its locking mechanism.

The lever 236 is provided with an outturned end 237, which is adapted to be contacted with by the pivoted dog 238 carried by the rack 56. This dog, as will be noted from Fig. 7, is free to swing in one direction, that is as the rack 56 is lowered, but when making a new set-up the one arm of this will contact with the pin 239 while the other arm contacts with the projection 237 of the lever 236 thus raising it and releasing the pin 234 thereby permitting the levers 231 and 233 to drop by gravity and assume the position illustrated in Fig. 7. In this way the residue valve operating mechanism is released in such a manner that upon the operation of the dispensing valve mechanism, the residue valve will automatically close and permit the dispensing of the liquid to take place. However after dispensing and clearing of the mechanism, as will be hereinafter described, the residue valve is locked in open position so that it will be impossible to supply liquid to the bowl and drain it out through the dispensing valve because this valve is then in such position that it cannot be opened. In fact the dispensing valve is so arranged that it can at no time be opened until a set-up of at least one quantity unit has been made and that quantity of liquid supplied to the bowl.

Within the casing 30 is located an air pump 240, which is provided with a piston rod 241. This piston rod is attached to the pump lever 44. The purpose of the air pump is to supply air to the reservoir 242. Air from the reservoir 242 is admitted to the air cylinder 164 through pipes 243 and 244. The passage of air through these pipes or conduits is controlled by means of a valve 245, which is provided with a button 246 so that the valve can be readily opened. This controls the dispensing valve.

Air is similarly admitted from the reservoir 242 to the cylinder 165 by means of a valve 247, which controls the passage of air and which valves are also operated by means of a push button or similar device 248. This controls the residue release and is used when it is desired to drain the bowl of liquid without any dispensing taking place. It is used in connection with our device for the issuance of miscellaneous sales tickets or for draining the bowl after part of its contents have been dispensed preparatory to making a new set-up.

The operation of our device is as follows: After the installation has been properly made, the first step is to make a set-up in the dispensing bowl. This is done by moving the gauge 73 around on the indicating plate or dial 61 to the desired number of quantity units. The handle 63 is then pulled outward so as to release the pin 62 from one of the openings 72. This exerts a pull on the shaft 66 and draws the ratchet wheel 68 forward so that the dog 69 carried thereby can contact with the pin 70 carried by the gear 57. (See Fig. 13.) The handle is then turned until the pin 62 contacts with the gauge 73 when the handle is released so that the pin 62 can enter the proper recess 72 on the plate 61. During the rotation of the gear 57 the pin 80 carried thereby has moved away from the inclined face of the projection 81 releasing the pawl or dog 82 and permitting the tooth 86 to engage with the ratchet teeth on the ratchet wheel 68. When the handle is thus released, the dog 69 is no longer in contact with the pin 70 but even if the handle is again pulled out, it cannot be moved in a retrograde direction being prevented from doing so by means of engagement of the pawl or dog 82 with the ratchet wheel.

The turning of the gear 57 raises the rack 56 and together with it the yoke 52 and consequently the dispensing tube. During the raising of the yoke 52 it contacts with the pivoted dog 186 carried by the ratchet 185 so that the ratchet will assume the position shown in Fig. 19 thus releasing the pump for action.

During this time the float 126 and lever 124 have also been raised simultaneously with the dispensing tube 49 permitting the tooth 125 to enter one of the recesses 130 in the bar 129. This bar being secured to the cap or top 34 of the dispensing tube prevents any lowering of the dispensing tube while the tooth 125 is within one of the notches 130. The pump is then operated so as to supply liquid through the supply tube 39 to the dispensing bowl. This pumping is continued until liquid supplied commences to overflow the upper edge of the dispensing tube at which time the float 126 will have raised so as to automatically unlock the dispensing tube, it being understood, of course, that during all of this time the residue valve 92 is open so that surplus liquid can return to the storage tank through the pipe 93.

When the cam lever 193 is moved so that the clutch members are disengaged, then upon the locking of the device, when the printing of a ticket occurs, the pin 233a contacts with the cam lever 193 forcing the end 193a thereof downward so that the pin 192 will contact with the cam lever. This prevents any manipulation whatever of the serving or dispensing valve during the time that the device is in this locked position. Consequently even if fluid should be supplied to the bowl while the dispensing valve is locked in open position after a ticket has been printed, there can be no possibility of opening the serving valve so that no liquid whatever can enter the dispensing nozzle and conduit. It will, therefore, be seen that unless a set-up is made for a predetermined quantity of liquid in the bowl, no liquid can pass out through the serving nozzle.

The movement of the lever 106 also permits the release of one of the stops carried by the rack 114. The action of the plate 168 on the roller 158 will continue as long as the valve 245 is held open but the shaft 102 will immediately return to its original position due to the fact that the end 162 of the cam lever 159 has contacted with the plate 97 raising this lever so as to release the pin 160. The shaft 102 is then returned to its original position by the counterweighted lever 161 thus releasing the lever 106 and permitting it to swing back so as to lock the lever 109. This is done before the next succeeding stop reaches the dog 112. Therefore, it will be seen that the dispensing takes place only unit by unit. If it is desired to drain the bowl completely before dispensing all of the liquid therein, the valve 248 is operated. This causes the plate 169 to move upward, contact with the roller 232 and operate the levers 231 and 233.

This in turn operates the shaft 101, which shaft will release the lever 106 by reason of the flat surface 104 carried by the cam 103 and due to the fact that the pin 234 has engaged with the notch 235, this lever is held out so that the tube can descend to its lowermost position.

As the tube descends, it will be understood, of course, that the racks 56 and 114 also descend carrying the yoke 52 to its lowest position.

During the lowering of the rack 56, that is when it about reaches its lowest position, the inclined face 221 of the cam plate 222 contacts with the pin 220 swinging the lever 219 over so that the pivoted dog 224 will be in the path of travel of the plate 168. The pin 227 enters the notch 226 permitting the locking lever 236 to drop holding the lever 219 so that it can not swing back. During this downward movement the dogs 228 and 238 have passed beneath the levers 225 and 236 being free to swing so that this movement can take place. During all this time the residue valve is held open so that the liquid can drain back into the storage reservoir.

Then upon the commencement of the next set-up the dogs 228 and 238 will contact with the ends of the levers 225 and 226 respectively, raising them and releasing the levers 219 and 231 and 233 so that they can assume the position shown in Fig. 7. Further manipulation of the set-up again raises the dispensing tube and releases the pump locking rack 185.

As the dispensing tube is lowered the gear 57 is also rotated by the rack 56 in a reverse direction and when the dispensing tube reaches its lowermost position, the pin 80 has contacted with the inclined face of the lug 81 releasing the dog from the ratchet wheel 68. This permits the handle 63 to be brought back to its starting position and ready for a new set-up.

If the position of the projections or dogs 113 carried by the rack 114 is such that an accurate unit quantity is not obtained, the stop can be raised and lowered by loosening the nut 121 and turning the eccentric head 119 of the bolt 118 in either direction so that the stop can be raised and lowered as desired to get the proper unit quantity after which the nut is again tightened. In this way each of the stops can be adjusted separately because we have found that in transparent bowls, which are usually made of glass, it is impossible to maintain a uniform diameter throughout. Therefore, adjustment of the stops must be provided for.

Having fully described our invention, what we claim is:—

1. A liquid dispensing device comprising a transparent bowl, means for supplying liquid to said bowl, a vertically movable dispensing tube extending into said bowl, means for raising said tube for predetermining the amount of liquid retained in said bowl, means for lowering said tube step by step thereby dispensing liquid unit by unit, and means for preventing the lowering of said dispensing tube unless the amount of liquid predetermined by the set-up of said dispensing tube has been supplied to the bowl.

2. A liquid dispensing device comprising a transparent bowl, means for supplying liquid to said bowl, means for predetermining the amount of liquid to be retained in said bowl, means for withdrawing liquid from said bowl, and means located in said dispensing bowl for preventing the withdrawal of liquid therefrom unless the quantity of liquid predetermined to be retained therein has been supplied to said bowl.

3. A liquid dispensing device comprising a transparent bowl, means for supplying liquid to said bowl, a vertically movable dispensing tube extending into said bowl, means for raising said tube for predetermining the amount of liquid retained in said bowl, means for lowering said tube step by step, and means located in said dispensing bowl for preventing the withdrawal of liquid therefrom unless the quantity of liquid predetermined to be retained therein has been supplied to said bowl.

4. A liquid dispensing device comprising a transparent bowl, means for supplying liquid to said bowl, a vertically movable dispensing tube extending into said bowl, means for raising said tube for predetermining the amount of liquid retained in said bowl, means for lowering said tube step by step, and float control means for preventing the lowering of said dispensing tube unless the amount of liquid predetermined by the set-up of said dispensing tube has been supplied to the bowl.

5. A liquid dispensing device comprising a transparent bowl, means for supplying liquid to said bowl, a vertically movable dispensing tube extending into said bowl, means for raising said tube for predetermining the amount of liquid retained in said bowl, means for lowering said tube step by step, and float control means located in said dispensing bowl for preventing the withdrawal of liquid therefrom unless the quantity of liquid predetermined to be retained therein has been supplied to said bowl.

6. A liquid dispensing device comprising a transparent bowl, means for supplying liquid to said bowl, means for predetermining the amount of liquid to be retained in said bowl, means for withdrawing liquid from said bowl unit by unit, means for preventing withdrawal of liquid from said bowl unless the quantity predetermined to be retained in said bowl has been supplied thereto, and means for preventing the supply of additional liquid to said bowl after withdrawal has commenced.

7. A liquid dispensing device comprising a transparent bowl, means for supplying liquid to said bowl, a vertically movable dispensing tube extending into said bowl, means for raising said tube for predetermining the amount of liquid retained in said bowl, means for lowering said tube step by step, means for preventing the lowering of said dispensing tube unless the amount of liquid predetermined by the set-up of said dispensing tube has been supplied to the bowl, and means for preventing the supply of additional liquid to said bowl after withdrawal has commenced.

8. A liquid dispensing device comprising a transparent bowl, a pump for supplying liquid to said bowl, a vertically movable dispensing tube extending into said bowl, means for raising said dispensing tube in said bowl for predetermining the amount of liquid to be retained in said bowl, means for lowering said dispensing tube step by step, means for preventing the lowering of said dispensing tube unless the amount of liquid predetermined by the set-up has been supplied to said bowl, and means for automatically locking said pump against operation before a set-up has been made, said means also locking the pump against operation simultaneously with the commencement of dispensing.

9. A liquid dispensing device comprising a transparent bowl, means for supplying liquid to said bowl, a vertically movable dispensing tube extending into said bowl, means for raising said tube in said bowl for predetermining the amount of liquid retained in said bowl, means for locking said tube raising means so as to prevent retrograde movement thereof after a set-up has been started, means for lowering said tube step by step for dispensing liquid from the bowl unit by unit, and means for preventing the lowering of the dispensing tube unless the amount of liquid predetermined by the set-up of the dispensing tube has been supplied to the bowl.

10. A liquid dispensing device comprising a transparent bowl, means for supplying liquid to said bowl, means for predetermining the amount of liquid to be retained in said bowl, means for withdrawing liquid from said bowl, means for preventing the withdrawal of liquid from said bowl unless the quantity predetermined to be retained in said bowl has been supplied thereto, and means for preventing the supplying of liquid to said bowl until a predetermination of liquid to be retained in said bowl has been made.

11. A liquid dispensing device comprising a transparent bowl, means for supplying liquid to said bowl, a vertically movable dispensing tube extending into said bowl, means for raising said tube for predetermining the amount of liquid retained in said bowl, means for lowering said tube step by step, means for preventing the lowering of said dispensing tube unless the amount of liquid predetermined by the set-up of said dispensing tube has been supplied to the bowl, and means for preventing the supplying of liquid to said bowl until a predetermination of liquid to be retained in said bowl has been made.

12. A liquid dispensing device comprising a transparent bowl, means for supplying liquid to said bowl, means for predetermining the amount of liquid to be retained in said bowl, means for withdrawing liquid from said bowl, means located in said dispensing bowl for preventing the withdrawal of liquid therefrom unless the quantity of liquid predetermined to be retained therein has been supplied to said bowl, and means for preventing the supplying of liquid to said bowl until a predetermination of liquid to be retained in said bowl has been made.

13. A liquid dispensing device comprising a transparent bowl, means for supplying liquid to said bowl, means for predetermining the amont of liquid to be retained in said bowl, means for withdrawing liquid from said bowl, float control means for preventing the withdrawal of liquid from said bowl unless the quantity predetermined to be retained in said bowl has been supplied thereto, and means for preventing the supplying of liquid to said bowl until a predetermination of liquid to be retained in said bowl has been made.

14. A liquid dispensing device comprising a transparent bowl, means for supplying liquid to said bowl, a vertically movable dispensing tube extending into said bowl, means for raising said tube for predetermining the amount of liquid retained in said bowl, means for lowering said tube step by step, means for preventing the lowering of said dispensing tube unless the amount of liquid predetermined by the set-up of said dispensing tube has been supplied to the bowl, means for preventing the supply of additional liquid to said bowl after withdrawal has commenced, said means also preventing the supply of liquid to said bowl until a predetermination of liquid to be retained therein has been made.

15. A liquid dispensing device comprising a transparent bowl, means for supplying liquid to said bowl, a vertically moving yoke located below said bowl, a dispensing tube carried by said yoke and extending into said bowl, means for raising said yoke and tube simultaneously, a rack carried by said yoke and movable therewith, spaced apart bolts having eccentric cylindrical heads carried by said rack, dogs having slots therein carried by said rack and bolts and contacting with said heads whereby said dogs can be adjusted up and down as said heads are turned.

16. A liquid dispensing device comprising a transparent bowl, means for supplying liquid to said bowl, a vertically moving yoke located below said bowl, a dispensing tube carried by said yoke and extending into said bowl, means for raising said yoke and tube simultaneously, a rack carried by said yoke and movable therewith, spaced apart bolts having eccentric cylindrical heads carried by said rack, dogs having slots therein carried by said rack and contacting with the heads of said bolts whereby said dogs can be adjusted up and down on said rack as said bolt heads are turned, and pins carried by said dogs and projecting into slots formed in said rack for preventing said dogs from tipping.

In testimony whereof we have affixed our signatures.

GEORGE S. COX.
HARRY J. ALMSTEDT.